United States Patent Office 2,990,224
Patented June 27, 1961

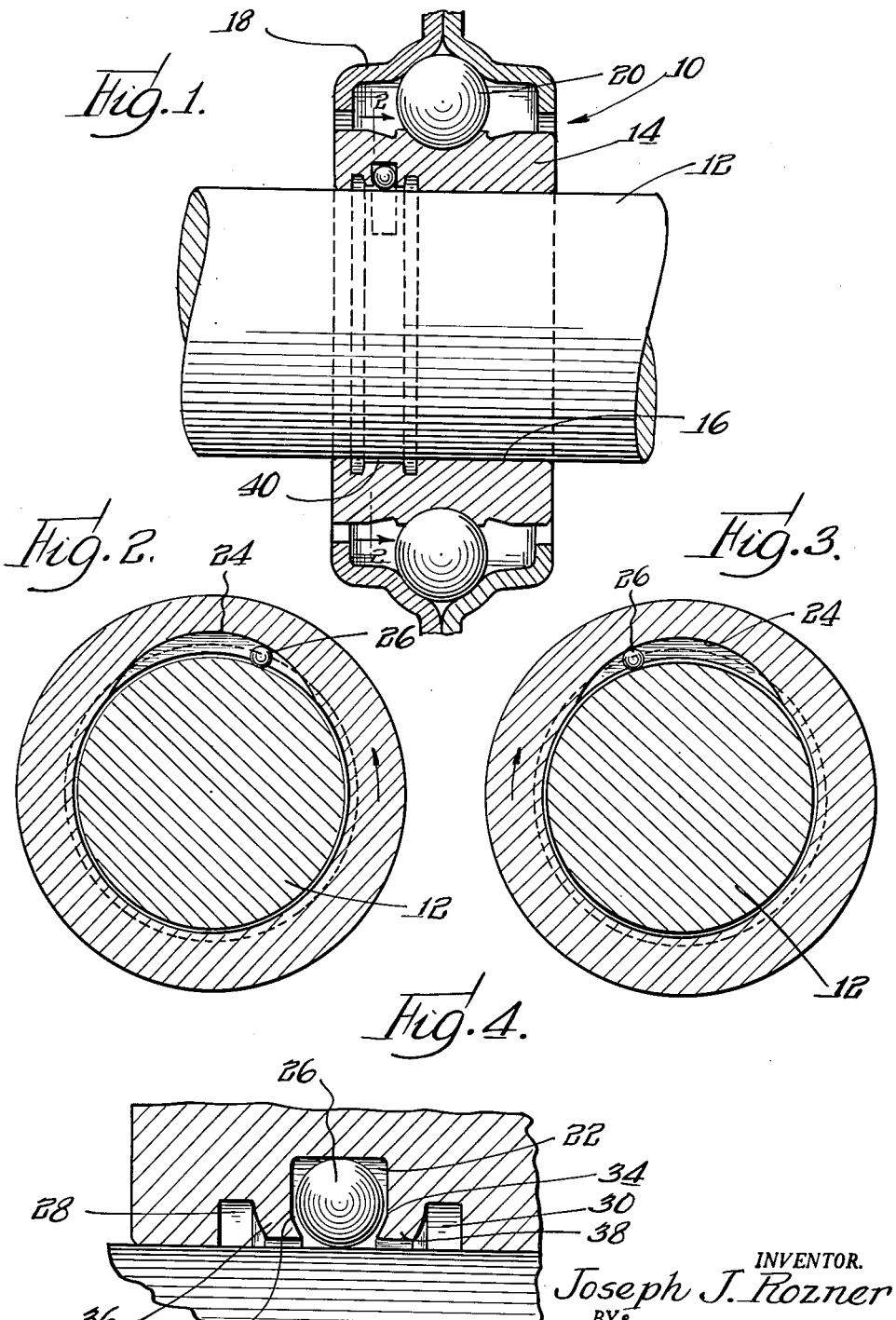

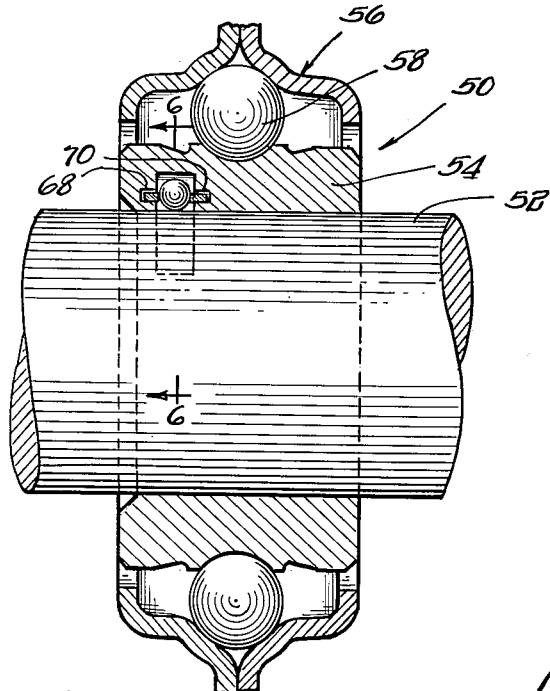
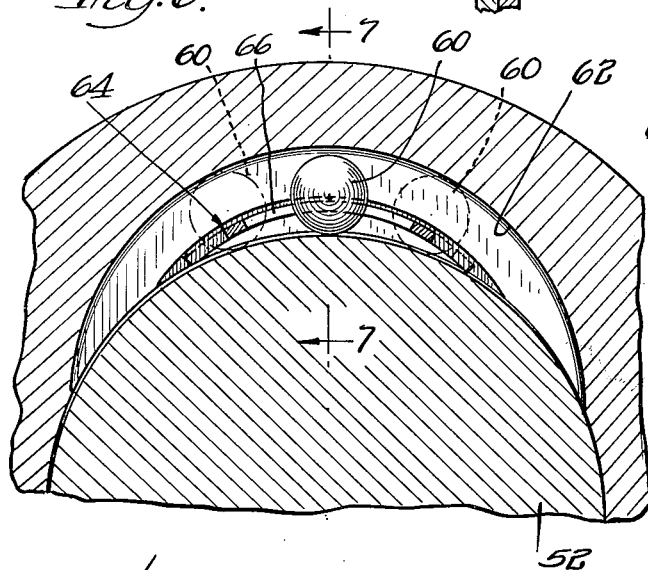
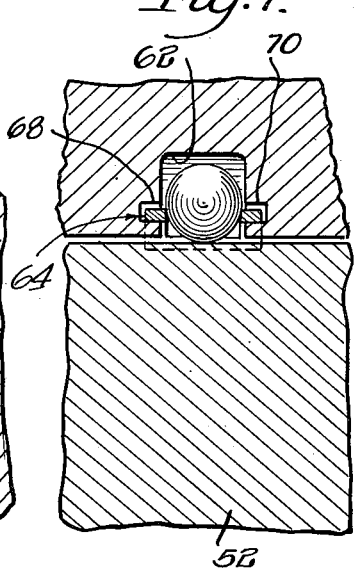
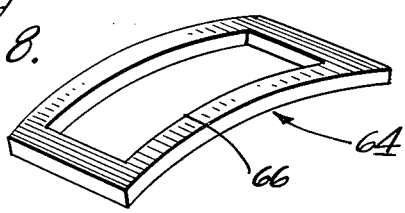

2,990,224
BEARING
Joseph J. Rozner, Chicago, Ill., assignor to Parkersburg-Aetna Corporation, Chicago, Ill., a corporation of West Virginia
Filed July 20, 1955, Ser. No. 523,216
4 Claims. (Cl. 308—236)

The present invention relates to a novel bearing assembly adapted to be mounted on a shaft, and more particularly to a bearing assembly having novel means for locking the inner race thereof against rotation relative to the shaft.

It has heretofore been suggested to lock inner bearing races or hub members against rotation relative to a shaft by means of a ball or a wedge member which acts between an eccentric cam surface on the inner bearing race and the shaft. In many of these prior proposals the ball or other locking element is not permanently interconnected with the bearing race or hub member so that it may easily be dropped and become lost during assembly of the hub or bearing race or with removal of the bearing race from a shaft, and in other prior proposals the locking element is retained in assembled relationship with the inner bearing race or hub member by relatively complicated means so that the structure is unduly difficult and expensive to manufacture.

An important object of the present invention is to provide a preassembled unit including an inner bearing race or hub member and a locking element for preventing rotation of the unit relative to a shaft, which unit is formed so that it may be readily and economically manufactured and assembled and so that the locking element is securely retained in the assembly.

A further object of the present invention is to provide a novel preassembled unit of the described type which is formed so that it will be effectively locked against rotation in either direction relative to a shaft or the like.

A more specific object of the present invention is to provide a novel unit of the above described type wherein the inner bearing race or hub member is provided with an eccentric slot into which a ball or other locking element may easily be inserted, which bearing race or hub member is also constructed so that it may be readily deformed freely to retain the locking element in the slot.

Other objects and advantages of the present invention will become apparent from the following description and the accompanying drawings wherein:

FIG. 1 is a cross sectional view showing a bearing unit embodying the principles of the present invention mounted on a shaft;

FIG. 2 is a sectional view taken along line 2—2 in FIG. 1 and showing the ball or locking element positioned to prevent the inner bearing race from rotating in a counterclockwise direction relative to the shaft;

FIG. 3 is a cross sectional view similar to FIG. 2 but showing the locking ball positioned to prevent the inner bearing race from rotating in a clockwise direction with respect to the shaft;

FIG. 4 is an enlarged fragmentary sectional view showing in greater detail the manner in which the locking element is retained in assembled relationship with the inner bearing race or hub member;

FIG. 5 is a partial cross sectional view showing a modified form of the present invention;

FIG. 6 is an enlarged fragmentary cross sectional view taken along line 6—6 in FIG. 5;

FIG. 7 is a fragmentary cross sectional view taken along line 7—7 in Fig. 6; and FIG. 8 is a perspective view showing a ball retainer member utilized in the modified form of this invention.

Referring now more specifically to the drawings wherein like parts are designated by the same numerals throughout the various figures, a bearing unit or assembly 10 embodying the principles of this invention is shown mounted on a circular shaft 12. The bearing unit or assembly includes an inner annular bearing race or hub member 14 having an inner bore 16 with a diameter similar to the diameter of the shaft 12. An outer bearing race 18 encircles the race 14, and a plurality of balls or other suitable anti-friction elements 20 are disposed between the inner and outer races.

In order to lock the bearing race 14 against rotation relative to the shaft 12, a slot 22 is formed in the wall of the bore 16, which slot has an arcuate bottom surface 24 eccentrically disposed with respect to the center of the bearing race, and a ball wedging or locking element 26 is disposed in the slot. As will be understood, when the shaft is rotated in one direction, the locking element or ball 26 will be wedged between one end portion of the cam surface 24 and the shaft so as to lock the bearing race 14 against relative rotation, and when the shaft is rotated in the opposite direction, the locking element will be wedged between the opposite end portion of the cam surface 24 and the shaft to prevent relative rotation of the bearing race 14.

In accordance with a feature of the present invention, the ball 26 is retained in preassembled relationship with the bearing race 14 as shown best in FIGS. 1 and 4. More specifically, a pair of annular grooves 28 and 30 are formed in the wall of the bore 16 at opposite sides of the slot 22, which grooves have a depth substantially less than the maximum depth of the slot 22 whereby radially inner portions of the slot side walls 32 and 34 are provided by relatively thin deformable arcuate wall sections 36 and 38. The distance between the slot side walls 32 and 34 is greater than the diameter of the ball 26 and these walls are preferably formed so that they are substantially initially parallel to each other throughout their entire depths whereby the ball may be easily inserted into the slot. After the ball is assembled within the slot, the wall sections 36 and 38 are peened inwardly in the manner shown so as to restrict the mouth of the slot 22 sufficiently to retain the ball while, at the same time, permitting free movement of the ball within the slot. Preferably, the diameter of the bore 16 is enlarged between the grooves 28 and 30 as indicated at 40 so as to provide a clearance between the ends of the wall sections 36 and 38 and the shaft whereby they will not interfere with the locking action of the ball. The eccentric slot and the grooves are formed so that they are spaced axially outwardly from the annular ball seat of the bearing race 14 so as the avoid weakening the bearing race behind the ball bearings.

The annular grooves and the eccentric slots are formed in the steel bearing race before the race has been heat treated and hardened. The ball 26 which is also preferably made from steel, is assembled with the bearing race while it is relatively soft, or in other words, before it has been hardened. Then after the wall sections 36 and 38 have been peened inwardly, the bearing race and ball 26 are heat treated and hardened simultaneously by any suitable known procedure. The method including this sequence of steps promotes economical production of the unit since a separate hardening operation for the ball is eliminated.

In FIGS. 5 through 8 there is shown a modified form of the present invention which includes a bearing assembly 50 adapted to be mounted on or carried by a shaft 52. This bearing assembly includes an inner hub or race 54, outer race means 56 and a plurality of balls or anti-friction elements 58 disposed therebetween. The inner race 54 is locked against rotation relative to the shaft 52 by means of a ball 60 disposed in an eccentric slot 62 formed in the inner wall of the race 54. In this embodiment the ball 60 is held within the slot 62 by means of a separate retainer member 64 rather than by inwardly swaging side walls of the slot as in the embodiment described above. More specifically, the retainer 64 is in the form of an elongated sheet material member having a slot 66 therein through which the ball 60 extends for engagement with the shaft 52. However, as shown in FIG. 7, the width of the slot 66 is less than the diameter of the ball 60 so that the inner edges of the retainer member project beneath and retain the ball. Arcuate grooves 68 and 70 are formed in opposite side walls of the eccentric slot 62 for receiving opposite sides of the retainer member in the manner shown. The retainer member which is preferably formed from sheet steel is initially arcuately shaped as shown in FIG. 8 to facilitate insertion thereof into the grooves. The ball 60 is placed within the slot 66 and along the inner or back side of the retainer 64 before insertion of the retainer into the grooves 68 and 70. The retainer then is slid endwise into the grooves, and the ball is carried with it. It will be appreciated that the structure of this embodiment like the structure of the embodiment described above permits the ball to be assembled into the eccentric slot from within the bearing race so that the peripheral surface of the bearing race need not be interrupted for the purpose of providing a passageway through which the locking ball may be inserted into the eccentric slot, and it is also seen that the manner in which the locking ball is retained within the arcuate slot in accordance with the present invention eliminates the need for passing set screws and the like through the bearing race as has heretofore been proposed for certain types of locking elements.

From the above description, it is seen that the present invention has provided a bearing assembly including a locking or wedging element for preventing rotation of the inner bearing race or hub member relatively to a shaft, which locking element may be readily assembled with the inner bearing race and is securely retained in preassembled relationship in a simple and inexpensive manner.

While the preferred embodiment of the present invention has been shown and described herein, it is obvious that many structural details may be changed without departing from the spirit and scope of the appended claims.

The invention is claimed as follows:

1. In an anti-friction bearing an inner bearing race having an annular bearing seat on its peripheral surface and a bore for receiving a shaft, arcuate slot means having a bottom cam surface formed in a wall of and eccentrically disposed with respect to said bore and spaced axially from said annular bearing seat, a pair of annular groove means in said bore wall spaced axially of opposite sides of said slot means and having a depth less than the maximum depth of said slot means, a pair of relatively narrow deformable arcuate wall sections respectively extending generally radially between said groove means and said slot means and providing opposite side wall portions of said slot means, a locking ball freely disposed within said slot means for wedging between said cam surface and a shaft to restrain rotation of said inner bearing race member relative to the shaft in opposite directions, and free margins of said wall sections being peened inwardly of said slot means for retaining said locking ball within the slot means.

2. A method of making a unit of the type described from an apertured hub member of relatively soft metal having an eccentric slot in an internal wall thereof and a ball of relatively soft metal, comprising inserting the ball in said slot, peening inwardly a wall of the slot to retain the ball and subsequently simultaneously heat treating and hardening the hub member and ball.

3. The method of making a unit of the type described from an apertured hub member of relatively soft metal having an eccentric slot in an internal wall thereof and a ball of relatively soft metal, comprising inserting the ball in the slot, deforming inwardly a wall of the slot to retain the ball, and subsequently heat treating and hardening the hub member and ball simultaneously.

4. An anti-friction bearing comprising, in combination, concentric inner and outer bearing races, a circumferentially spaced series of rotary bearing elements interposed between said races to journal the latter on each other, said inner bearing race member having a circular support wall defining a bore for receiving a shaft, said inner race defining an arcuate slot in said wall having a bottom cam surface eccentrically disposed with respect to said bore, said inner race defining a pair of axially spaced arcuate grooves in said bore wall at opposite sides of said slot and having a depth less than the maximum depth of said slot, a pair of relatively narrow deformable arcuate wall sections respectively extending generally radially between said grooves and said slot and forming opposite side wall portions of said slot, a locking element freely disposed within said slot for wedging between said cam surface and a shaft to restrain rotation of said inner bearing race member relatively to the shaft, the radially inward portion of said locking element having a width along the axis of the bearing races which is materially less than the corresponding maximum width of the locking element, and the radially inward margins of said wall sections being peened inwardly of said slot means for retaining said locking element within the slot means.

References Cited in the file of this patent
UNITED STATES PATENTS

| | | |
|---|---|---|
| 422,025 | Macdonald | Feb. 25, 1890 |
| 880,255 | Vandegrift et al. | Feb. 25, 1908 |
| 1,412,688 | Layton et al. | Apr. 11, 1922 |
| 1,788,891 | Runge | Jan. 13, 1931 |
| 1,835,991 | Runge | Dec. 8, 1931 |
| 2,236,481 | Storz | Mar. 25, 1941 |
| 2,697,016 | Spurgeon | Dec. 14, 1954 |